United States Patent Office 3,269,433
Patented August 30, 1966

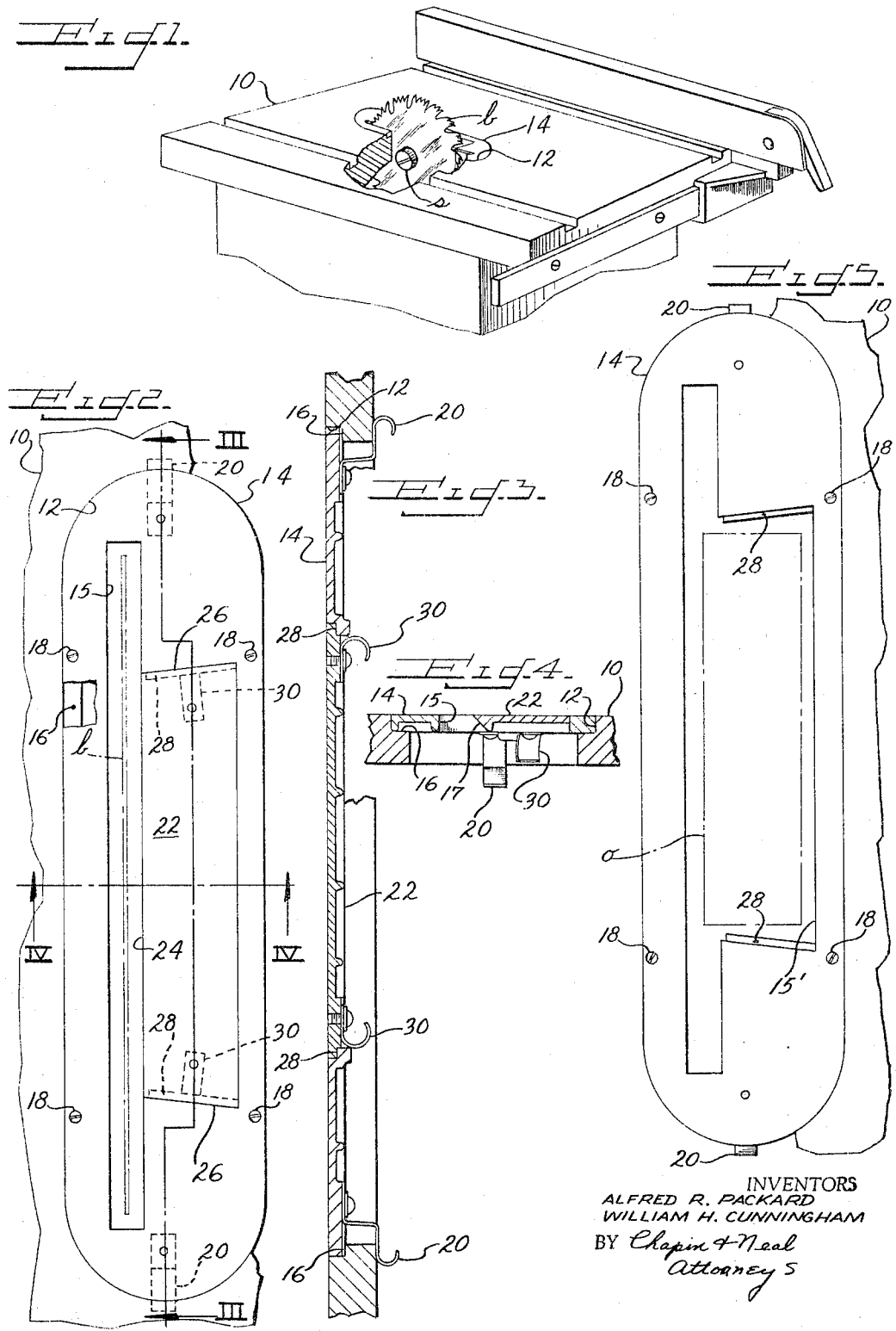

3,269,433
MULTI-PURPOSE WOODWORKING TOOLS
Alfred R. Packard and William H. Cunningham, Springfield, Mass., assignors to Toolkraft Corporation, Springfield, Mass., a corporation of Massachusetts
Filed Sept. 2, 1964, Ser. No. 393,973
3 Claims. (Cl. 143—132)

The present invention relates to improvements in woodworking tools.

The use of accessory equipment to obtain multi-purpose use of woodworking power tools is an increasingly prevalent practice. The tool, or machine, is treated as a power unit and employed for various purposes. Table type circular saws are particularly adapted for such multi-purpose use. Thus, beyond operations using a saw blade, this machine is also employed as a sander, a shaper, and to cut slots of various widths.

The object of the invention is to facilitate such multi-purpose use of table type circular saws.

This end is attained by the provision of an improved insert plate for the opening in the saw table which gives access to the powered spindle on which different cutters are mounted. The insert plate is removably mounted in this opening and provided with a narrow slot through which saw blades or the like project when mounted on the powered spindle. One side of this narrow slot is defined, at least in part, by a secondary insert plate which is removable to provide a wider slot through which a dado head or form cutter may project when mounted on the powered spindle. In this fashion the insert plate will properly support workpieces in close adjacence to different types of cutters.

The above and other related objects and features of the invention will be apparent from a reading of the following description of the disclosure found in the accompanying drawing and the novelty thereof pointed out in the appended claims.

In the drawing:

FIG. 1 is a perspective view of a table type circular saw embodying the present invention;

FIG. 2 is a fragmentary plan view of the saw table illustrating the novel insert plate previously referred to;

FIG. 3 is a section taken on line III—III in FIG. 2;

FIG. 4 is a section taken on line IV—IV in FIG.2; and

FIG. 5 is a view similar to FIG. 2 showing the insert plate used for a different type of tool.

In the drawing FIG. 1 illustrates a circular saw embodying the present invention. Such saws conventionally comprise a table 10 for supporting workpieces as they are advanced past a rotary saw blade b which projects upwardly from beneath the table 10. The blade b is mounted on a powered spindle s which is usually driven by an electric motor generally mounted to the rear and beneath the level of the table 10.

Most conveniently, access to the powered spindle is provided by an opening 12 formed thereabove in the table 10. This opening is then covered by an insert plate 14 which is slotted at 15 to provide clearance for the blade b. As can be seen from FIG. 4, one side of the slot 15 is beveled at 17 to provide clearance for the blade b when either the table or the blade is tilted to make angle cuts, a common practice on this type of machine. The upper surface of the insert plate 14 is disposed at the same level as the table 10 to provide proper support for workpieces up to a point of close adjacence with the blade b.

As can be seen from FIGS. 2 and 3, the insert plate 14 rests on a ledge 16 formed marginally of the opening 12 beneath the upper surface of the table 10. Leveling screws 18 are threaded through the insert plate 14 and engage the ledge 16 to accurately position the upper surface of the insert plate at the same level as the supporting surface of the table 10. Spring clips 20 on the insert plate 14 engage an undersurface of the table 10 to releasably secure the insert in its illustrated supporting position.

As has been previously indicated, the tool or machine shown in the drawings and commonly referred to as a circular saw, is also used to perform other cutting operations and in this sense is a multi-purpose tool. Thus, it is frequently desired to substitute for the blade b either a dado attachment or a molding cutter head. These cutters are used respectively for cutting slots or grooves and contoured molding profiles or the like and both have a width greater than that of the blade b and are usually of a lesser diameter.

The same insert plate 14 may be used to cover the opening 12 and support workpieces when using these substitute cutters. To this end a secondary insert plate 22 is provided in the insert plate 14. The secondary insert plate has an edge 24 which defines in part the slot 15 and end edge faces 26 which are flared outwardly therefrom. The end faces 26 are engaged by matching surfaces on the insert plate 14 to laterally position edge 24 in proper relation to the remaining portions of insert plate 14 which define the slot 15. The secondary insert 22 rests on a discontinuous ledge 28 formed on the insert plate 14 beneath its opposite tapered ends 26 and is releasably maintained in this position by spring clips 30.

FIG. 5 illustrates the approximate outline o (at table level) of either substitute cutter relative to the slot 15′ which is provided upon removal of the secondary insert plate 22. Workpieces are thereby supported closely adjacent these substitute cutters by this simple expedient.

While variations in specific constructional details may be devised, the disclosed embodiment is the best known at this time and the scope of the inventive concepts is to be derived solely from the following claims.

Having thus described the invention, what is claimed as novel and desired to be secured by Letters Patent of the United States is:

1. In combination with a circular saw, or the like, having a powered spindle, a table overlying said spindle for supporting workpieces which are to be advanced past cutters mounted on the spindle, said table having an opening therein providing access to said spindle to facilitate mounting of different cutters thereon, a compositely formed insert plate removably mounted in said opening and having a narrow elongated slot through which a narrow cutter, as a saw blade projects, the upper surface of said insert plate being at the same level as the upper surface of said table to properly support workpieces closely adjacent the cutter, said insert plate further having a secondary insert plate defining, at least in part, one side of said slot and removable to provide a wider slot for cutters of greater width.

2. In combination with a circular saw, or the like, having a powered spindle, a table overlying said spindle for supporting workpieces which are to be advanced past cutters mounted on the spindle, said table having an opening therein providing access to said spindle to facilitate mounting of different cutters thereon, a compositely formed insert plate removably mounted in said opening and having a narrow elongated slot through which a narrow cutter, as a saw blade projects, the upper surface of said insert plate being at the same level as the upper surface of said table to properly support workpieces closely adjacent the cutter, said insert plate further having a secondary insert plate defining the central portion of one side of said slot and having a length less than that of said slot, said secondary insert plate being removable to provide a wider slot for cutters of greater width and lesser diameter.

3. In combination with a circular saw, or the like, having a powered spindle, a table overlying said spindle for supporting workpieces which are to be advanced past cutters mounted on the spindle, said table having an opening therein providing access to said spindle to facilitate mounting of different cutters thereon, a compositely formed insert plate removably mounted in said opening and having a narrow elongated slot through which a narrow cutter, as a saw blade projects, the upper surface of said insert plate being at the same level as the upper surface of said table to properly support workpieces closely adjacent the cutter, said insert plate further having a secondary insert plate defining the central portion of one side of said slot and having a length less than that of said slot, said secondary insert plate being removable to provide a wider slot for cutters of greater width and lesser diameter, the ends of said secondary insert plate being divergent from the slot defining portion thereof and cooperating means on said insert plate engaging said divergent ends and laterally positioning said secondary insert plate.

References Cited by the Examiner
UNITED STATES PATENTS 2,008,673   7/1935   Ocenasek.

WILLIAM W. DYER, JR., *Primary Examiner.*

W. D. BRAY, *Assistant Examiner.*